(12) United States Patent
Collar et al.

(10) Patent No.: US 9,807,568 B1
(45) Date of Patent: Oct. 31, 2017

(54) SYSTEM AND METHOD FOR PASSIVE BUILDING INFORMATION DISCOVERY

(71) Applicant: SIEMENS INDUSTRY, INC., Alpharetta, GA (US)

(72) Inventors: Benjamin Collar, Lawrence Township, NJ (US); Robert L. Welton, Clayton, NC (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/132,838

(22) Filed: Apr. 19, 2016

(51) Int. Cl.
| | | |
|---|---|---|
| *H04W 24/00* | (2009.01) | |
| *H04W 4/04* | (2009.01) | |
| *H04W 4/00* | (2009.01) | |
| *H04W 12/08* | (2009.01) | |
| *H04L 12/24* | (2006.01) | |
| *H04W 12/06* | (2009.01) | |
| *H04L 29/12* | (2006.01) | |

(52) U.S. Cl.
CPC ........... *H04W 4/043* (2013.01); *H04L 41/069* (2013.01); *H04L 61/6022* (2013.01); *H04W 4/008* (2013.01); *H04W 12/06* (2013.01); *H04W 12/08* (2013.01)

(58) Field of Classification Search
CPC ..... H04W 4/043; H04W 4/008; H04W 12/08; H04W 12/06; H04L 41/069; H04L 61/6022
USPC .......... 455/456.6, 456.1, 414.1, 456.3, 550.1
See application file for complete search history.

(56) References Cited

U.S. PATENT DOCUMENTS

| | | | |
|---|---|---|---|
| 9,608,765 B1 * | 3/2017 | Noonan | ................... H04K 3/80 |
| 2002/0072881 A1 | 6/2002 | Saitta | |
| 2009/0045939 A1 * | 2/2009 | Holland | ................ H04W 24/00 340/524 |

(Continued)

FOREIGN PATENT DOCUMENTS

WO    2013090515 A1    6/2013

OTHER PUBLICATIONS

University of New Hampshire, "Wireless Occupancy Detection | Smart Buildings & Infrastructure", Retrieved: Apr. 1, 2016, Retrieved From: "smartbuildings.unh.edu/?page_id=600".
Shen et al., "Walkie-Markie: Indoor Pathway Mapping Made Easy", Retrieved: Mar. 18, 2016, Retrieved From: "research.microsoft.com/en-us/um/people/moscitho/Publications/NSDI_2013.pdf".
Tekmar Control Systems Ltd., "Indoor Sensor 084", May 2007, pp. 1-4.
Vaas, Lisa, "Phones' accelerometers allow you to be tracked on the metro", NakedSecurity by Sophos, May 27, 2015, Retrieved From: "nakedsecurity.sophos.com/2015/05/27/phones-accelerometers-allow-you-to-be-tracked-on-the-metro/".
Roberts, Paul, "Proof of concept Android malware creates 3D maps of your home", NakedSecurity by Sophos, Oct. 2, 2012, Retrieved From: nakedsecurity.sophos.com/2012/10/02/proof-of-concept-android-malware-creates-3d-maps-of-your-home/.
Lester, Scott, "The Emergence of Bluetooth Low Energy", Context, May 21, 2015, Retrieved From: "www.contextis.com/resources/blog/emergence-bluetooth-low-energy/".

(Continued)

*Primary Examiner* — Khai M Nguyen (57) ABSTRACT

A system and method is provided that facilitates passive building information discovery. The system may include a processor configured to track positions in a building of portable devices over time and based thereon determine characteristics of the building including locations in the building where at least some of the portable device are unauthorized, based on communications received from radio-frequency (RF) sensors mounted in spaced-apart relation across the building. Such communications may include information detected by the RF sensors from RF signals from the portable devices that uniquely identify each portable device. The processor may be configured to determine when at least one of the portable devices is detected via a communication from at least one of the RF sensors at a determined unauthorized location in the building, and responsive thereto provide at least one notification that indicates that the at least one portable device was detected at the unauthorized location.

20 Claims, 7 Drawing Sheets

(56) References Cited

U.S. PATENT DOCUMENTS

| | | | |
|---|---|---|---|
| 2009/0171166 A1 | 7/2009 | Amundson et al. | |
| 2010/0176918 A1 | 7/2010 | Turner et al. | |
| 2011/0282697 A1* | 11/2011 | Fitzgerald | G06F 21/88 |
| | | | 705/4 |
| 2012/0161971 A1* | 6/2012 | Nasir | G07C 1/10 |
| | | | 340/573.4 |
| 2013/0012227 A1* | 1/2013 | Nadler | H04W 64/00 |
| | | | 455/456.1 |
| 2014/0049361 A1* | 2/2014 | Ahearn | G07C 9/00309 |
| | | | 340/5.7 |
| 2014/0266585 A1 | 9/2014 | Chao et al. | |
| 2015/0067785 A1* | 3/2015 | Donnellan | H04W 12/12 |
| | | | 726/4 |
| 2015/0310180 A1* | 10/2015 | Pattekar | G06F 19/327 |
| | | | 705/2 |
| 2016/0080943 A1 | 3/2016 | Ives-Halperin et al. | |
| 2016/0343187 A1* | 11/2016 | Trani | G07C 9/00119 |
| 2017/0018167 A1* | 1/2017 | Dey | G08B 25/008 |

OTHER PUBLICATIONS

PCT International Search Report and Written Opinion of International Searching Authority dated Jun. 27, 2017 corresponding to PCT International Application No. PCT/US2017/023519 filed Mar. 22, 2017.

\* cited by examiner

SYSTEM AND METHOD FOR PASSIVE BUILDING INFORMATION DISCOVERY

TECHNICAL FIELD

The present disclosure is directed, in general, to building technology such as systems that control and monitor buildings, and in particular to building security systems including access control systems for electrically locked doors, surveillance systems, and alarm systems (collectively referred to herein as building systems).

BACKGROUND

Building systems may include surveillance systems capable of monitoring the activates of people. Such building systems may benefit from improvements.

SUMMARY

Variously disclosed embodiments include data processing systems and methods that may be used to facilitate passive building information discovery. In one example, a system may comprise at least one processor configured to track positions in a building of a plurality of portable devices over time and based thereon determine characteristics of the building including locations in the building where at least some of the portable device are unauthorized, based on communications received from a plurality of radio-frequency (RF) sensors mounted in spaced-apart relation across the building, which communications include information detected by the RF sensors from RF signals from the portable devices that uniquely identify each portable device. In addition the at least one processor may be configured to determine when at least one of the portable devices is detected via a communication from at least one of the RF sensors at a determined unauthorized location in the building, and responsive thereto provide at least one notification that indicates that the at least one portable device was detected at the unauthorized location.

In another example, a method for passive building information discovery may comprise carrying out a plurality of acts through operation of at least one processor. Such acts may include receiving communications from a plurality of radio-frequency (RF) sensors mounted in spaced-apart relation across a building, which communications include information detected by the RF sensors from RF signals from a plurality of portable devices that uniquely identify each portable device. In addition the acts may include tracking positions in the building of the portable devices over time, based on the received communications. Further the acts may include determining characteristics of the building including locations in the building where at least some of the portable device are unauthorized, based on the tracked positions of the portable devices. Also the acts may include determining that at least one of the portable devices is detected via a communication from at least one of the RF sensors at a determined unauthorized location in the building. In addition, the acts may include providing at least one notification that indicates that the at least one portable device was detected at the unauthorized location.

A further example may include non-transitory computer readable medium encoded with executable instructions (such as a software component on a storage device) that when executed, causes at least one processor to carry out this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Various technologies that pertain to systems and methods that facilitate passive building information discovery will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
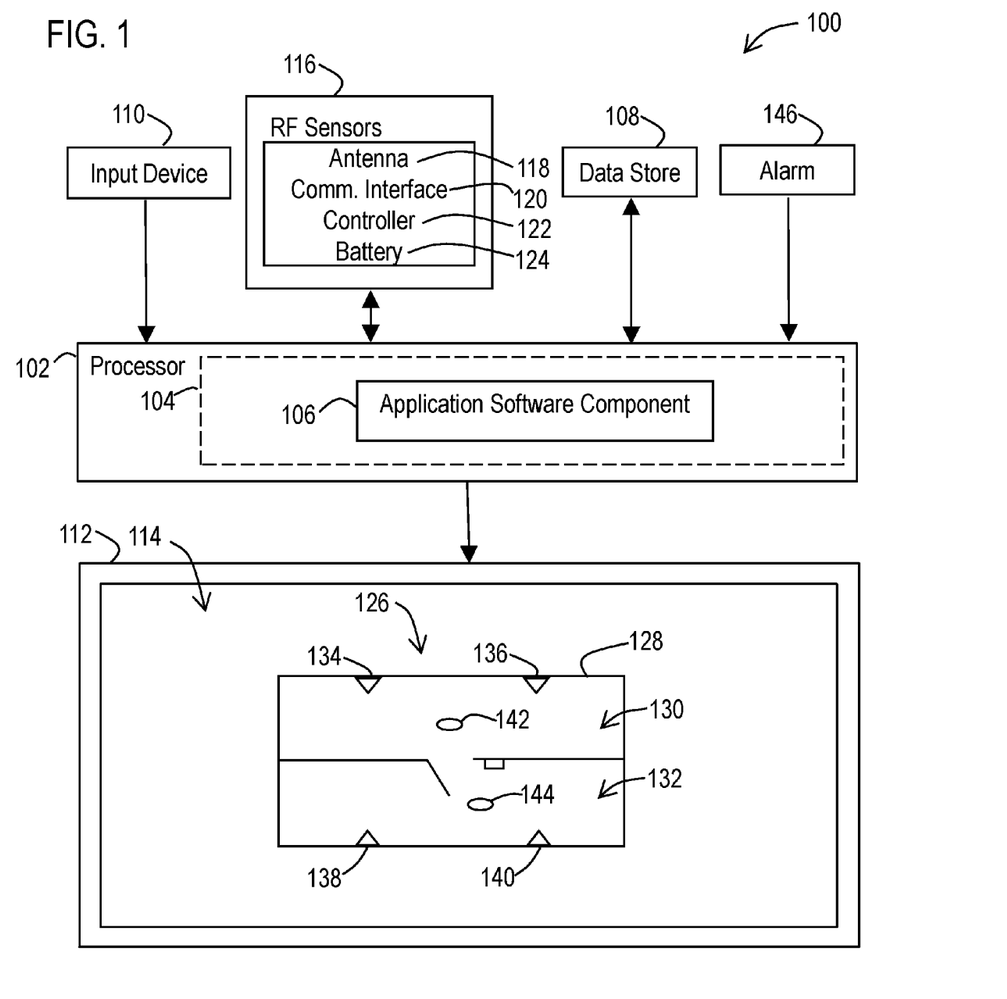
FIG. 1 illustrates a functional block diagram of an example system that facilitates passive building information discovery.

With reference to FIG. 1, an example data processing system 100 is illustrated that facilitates passive building information discovery. The system 100 may include at least one processor 102 that is configured to execute at least one application software component 106 from a memory 104 accessed by the processor. The application software component may be configured (i.e., programmed) to cause the processor to carry out various acts and functions described herein. For example, the described application software component 106 may include and/or correspond to one or more components of a surveillance software application that is configured to dynamically determine information regarding a building and store the building information in a data store 108 such as a database, hard drive, SSD, memory card or other type of device that stores non-volatile data.

The system may also include at least one input device 110 (e.g., keyboard, mouse, touch screen) and at least one display device 112 (e.g., display screen, monitor, touch screen). The input device may facilitate interaction with a graphical user interface (GUI) 114 displayed by the display device. Such a GUI may provide menus, buttons, a workspace, edit boxes, and/or any other user interface that is manipulated with inputs through the input device for use with configuring the application software component described herein. In an example embodiment, the application software component may be configured to display information through the GUI 114 regarding a building that is being monitored by the system. Such information, for example, may include a visual representation 126 of the building 128 as well as information determined by the system regarding the building.

It should be understood that as used herein, a building corresponds to any structure capable of including people therein and may correspond to a/an office building, school, factory, hospital, mall, airport terminal, stadium, or dormitory (which are typically built on land), as well as structures such as a cruise ship, oil platform, or naval vessel (which are supported by water), or any other type of structure in which people move around inside or thereon.

In an example embodiment, the system may include a plurality of radio frequency (RF) sensors 116. Such sensors may be placed in spaced-apart locations across the building and may be configured to detect one or more types of RF signals and communicate the detection of such RF signals to the processor 102. The RF sensors may have a form factor that includes an antenna 118 capable of receiving RF signals as well as a communication interface 120 capable of communicating the detection of RF signals to the processor 102 through wires or wirelessly (e.g., via RF signals as well). It should be appreciated that such RF sensors may include a controller circuit 122 that enables the detected RF signals to be communicated via the communication interface as well as a battery 124 and/or an external power input.

Example RF sensors may be configured to detect Bluetooth signals (e.g., compliant with IEEE 802.15.1 standards), WiFi signals (e.g., compliant with IEEE 802.11 standards), or any other type of RF signals that may be outputted by electronic portable devices carried by people in a building. Examples of portable devices that may output RF signals capable of being detected by the RF sensors 116 may include: mobile phones, tablets, media players, laptops, headsets, headphones, earbuds, glasses, watches, activity trackers, or any other wireless-enabled wearable or portable technology devices.

A particular example of RF signals that may be detected by the RF sensors may include Bluetooth low energy (BLE) signals generated by activity trackers, for example, (e.g., the Fitbit Tacker produced by Fitbit Inc. of San Francisco, Calif.). Activity trackers are wearable devices that may measure a number of steps walked, heart rate, calories burned, temperature, or other information about the body or activity of the person wearing the device. Activity trackers may include a processor, a display screen, and various sensors that are mounted to a strap and/or band capable of being worn around the wrist of a human. However, activity trackers may have other form factors such as being configured as or part of a watch, necklace, armband, earbuds and headphones.

Activity trackers (or other portable devices) may use BLE (branded as Bluetooth Smart) or other RF signals to communicate with another electronic device such as a mobile phone or computer. However, it should be appreciated that activity trackers (or other portable devices) may use other RF signals (such as WiFi) to wirelessly communicate with other devices and/or networks.

In addition, it should be appreciated that portable devices such as mobile phones (as well as some laptops and tablets) may be configured with cellular radios capable of communicating RF signals with cell towers. Thus, in some examples the RF sensors 116 may be configured to detect cellular RF signals outputted by portable devices.

In example embodiments, the described system 100 may be configured to determination information regarding a building based on the RF signals detected by portable devices moving around the building. For example, as illustrated in the visual representation 126 of an example building 128, the various, rooms 130, 132, hall ways, and/or other locations in the building may include one or more RF sensors 134, 136, 138, 140 mounted therein and/or adjacent thereto. As people wearing or holding portable devices 142, 144 move around the building, the RF signals from these devices may be detected by one or more of the RF sensors.

In this example, the visual representation 126 of the building 128 includes a visual representation of the RF sensors and portable devices. However, it should be appreciated that alternative embodiments may not provide a visual representation of the RF sensors or portable devices.

In example embodiments, the RF sensors may be capable of determining the RF power level of the RF signals. Also, in example embodiments, the RF sensors may be capable of determining information in the RF signals that is unique to each portable device. For example, portable devices may include a media access control (MAC) address, or other data that is usable to uniquely identify each device. In some embodiments, such portable devices may continuously or periodically output the RF signal with such a unique identifier. However, it should be appreciated that in other embodiments, the RF sensor may be configured to output a signal that triggers the portable devices to output their respective RF signal with their unique identifier.

The determined RF power level and unique identifiers for detected RF signals may be communicated by the RF sensors to the processor for use by the processor to track the movement of individual portable devices across the building. For example, the processor may be configured via the application software component 106 to use triangulation algorithms based on the relative power levels from three or more RF sensors detecting signals with the same unique identifier, to determine the position and movement of the portable device with that unique identifier.

To assist in the determination of the position and movement of portable devices, in example embodiments, the at least one processor 102 may be configured with information (e.g., stored in the data store 108) that specifies the location of each RF sensor in the building. The GUI of the application software component may enable such positions to be inputted by a user for example. However, it should be appreciated that the at least one processor 102 may be configured to determine the general relative locations of the RF sensors overtime based on correlations carried out on RF power levels and unique identifiers for many different portable devices moving across the building over time. Further, based on such correlations and the various places and paths that individual portable dives are detected, the at least one processor may be configured to determine a map of the placement of rooms and paths in the building. In an example embodiment, the visual representation 126 of the building 128 may be based on such a determined map. However, it should be appreciated that the visual representation of the building may alternatively or in addition be based on a previously prepared floor plan (e.g., an image file) of the building accessed by the processor from the data store 108.

It should be appreciated that floor plans of buildings may indicate the locations of rooms, hallways and other locations in a building, but often do not provide information as to which individual people are or are/not permitted to access different locations. For example, one or more rooms may have doors that are configured with electronic locks that are unlocked via an authorized card, badge or other token. Such rooms, or other locations secured via a lock may not be marked on a floor plan of a building. However, the location of such locked rooms or other locations may be useful for purposes by surveillance systems.

In an example embodiment of the described system 100, the processor 102 may be configured to track positions in the building 128 of a plurality of portable devices 142, 144 over time and responsive thereto determine characteristics of the building including locations in the building where at least some of the portable devices are unauthorized. Such locations, for example, may include a room or other area that is secured via a locked door, gate, turn style, or other lockable structure that restricts access to the location in the building to people having appropriate access permissions.

The at least one processor may be configured to determine the locations in the building where at least some of the portable devices are unauthorized based on communications received from the plurality of RF sensors mounted in spaced-apart relation across the building. Such communications include information detected by the RF sensors from RF signals from the portable devices that uniquely identify each portable device such as the MAC address of the portable device.

At least some of the examples described here are based on the insight that at least some portable devices are of a type that is personal to a particular user (i.e., is not shared among users). For example, a portable device in the form of an activity tracker may typically be worn by a single user each day for the usable life of the portable device. Based on where the user goes and does not go to in a building (via tracking the user's portable device over time) the at least one processor may be configured to determine where the user's portable device is or is not authorized to go in the building.

In this example, the at least one processor may be configured to provide at least one notification that indicates that the portable device was detected at an unauthorized location, based on a determination that the portable device is detected (via a communication from at least one of the RF sensors) at the determined unauthorized location in the building for that portable device.

In example embodiments, such a notification may correspond to storing a log of possible unauthorized accesses in the data store 108. The GUI 114 may be configured to enable the log to be displayed through the display device in order for security personnel to be informed of locations in the building which may require enhanced surveillance (e.g., via the addition of a security guard, video camera or other measure which better controls access to the unauthorized location).

In another example, the notification provided may correspond to a communication which triggers an alarm. Such an alarm, for example, may corresponds to activation of an alarm device (146) (e.g., a siren and/or flashing light) at the unauthorized location and/or in another location which notifies the user with the detected portable device, and/or security personnel that the location has been accessed by someone that may not be authorized to access the location.

In a further example, the notification may be provided via a wired and/or wireless network communication to a monitoring service (e.g., a server) which is configured to handle such notifications by alerting security personnel and/or law enforcement.

Also, in another example, the notification may be provided via short message service (SMS) text messages, instant message, e-mail, or other electronic communication to one or more mobile phones or other electronic device of individuals responsive for handing security for the building.

In addition, in another example the notification may be provided to another computing system, processor, server, and/or software application that is responsive to handing securing notifications. An example of a surveillance software application that may be adapted to include the described application software component 106 and carry out the functionality described herein, or may be adapted to receive the described notification, may include Surveillance SiteIQ Analytics, which is produced by Siemens Switzerland Ltd, of Zug Switzerland. However, it should be appreciated that the systems and methods described herein may be used in or with other surveillance systems and/or any other type of system that detects and/or handles unauthorized access to locations in a building.

As discussed previously, it should be appreciated that the described RF sensors may be operative to detect one or more different types of RF signals. For example, each RF sensor may detect more than one type of RF signal and/or the system may include different types of RF sensors each dedicated to detecting one or more different types of RF signals. Also, it should be understood that different types of RF signals may correlated to portable devices that are in general more personal to a user that portable devices that use other types of RF signals. For example, portable devices that use BLE signals (such as an activity monitor) may tend to be more personal to a user than portable devices that communicate WiFi signals (which may be more easily shared among users, and or which may not be continuous worn/carried by a user). Thus, the example system may be configured to determine trends as to which locations in a building are unauthorized for particular portable devices, taking into account the type of RF signals being detected. For example, the processor may be configured to determine such trends by taking into account that a BLE device may have a higher probability of providing accurate trends as to the location of unauthorized locations than WiFi devices. Also, in some embodiments, the described examples may be configured to only or primarily use BLE signals, based on the more personal nature of BLE enabled devices (e.g., activity monitors).

FIGS. 2-5 schematically illustrate several example sceneries by which the described system may be configured to dynamically determine locations in a building where at least some portable device are unauthorized and detect when a possible unauthorized access has occurred at such a location. However, it should be appreciated that example embodiments of the described system may or may not be configured to detect one or more of these described example scenarios.

Figure 2:
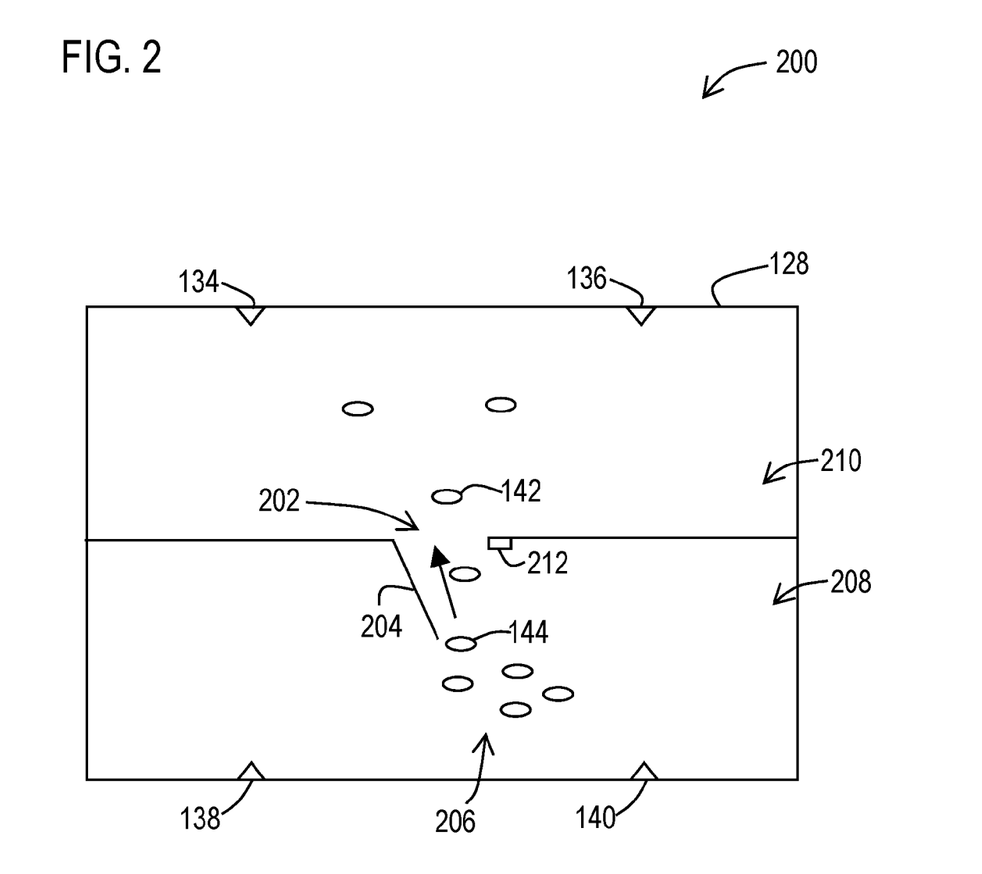
FIGS. 2-5 schematically illustrate several example sceneries by which the described system may be configured to dynamically determine locations in a building where at least some portable device are unauthorized.

In each of these examples, the at least one processor 102 may be configured (based on the application software component 103) to determine information about the building based at least in part on trends and correlations determined from the locations and/or movements of portable devices via RF signals. For example, with respect to FIG. 2, an example scenario 200 is illustrated in which the processor is configured to determine trends regarding the rate at which such portable devices typically pass given places in a building. Such trends may be used to determine choke points 202 in the flow of users that are indicative of a locked door, gate 204 or other security technology that is responsible for the choke point. Choke points may be detected by the at least one processor based on the detection of portable devices 206 that accumulate in an outside area 208 and slowly move through a first location having a limited space (i.e., the choke point 202) into a second location (e.g., a room 210). Thus, the detection of such choke points may correspond to a determination that the first location 202 corresponds to a location in which access is restricted by a security technology which slows the movement of people through the choke point. As illustrated in FIG. 2, the first location 202 may corresponds to an entrance to a room or building for example, that is configured with a door 204 that automatically unlocks responsive to an authentication of a user's access card (or other token) via a card reader 212 (or other type of token reader).

The system may be operative to automatically distinguish a choke point that represents a card accessed door/gate from a regular unlocked door/gate based on trends regarding the average flow rates through such doors/gates. For example, the system may be operative to determine that portable devices in some locations tend to move through limited spatial ranges, which likely represent a location of a door, gate, narrow hallway, or other narrow passageway. Further, the system may be operative to determine which of such narrow passageways are controlled by a card accessed door/gate based on the flow rate of detected portable devices through such passageways being substantially lower than flow rates through other passageways with the same or smaller spatial ranges in which portable devices tend to move therethrough. Thus, the system may be operative to distinguish a passageway corresponding to a locked door (in which portable devices move at a relatively slow rate) from a passageway corresponding to a narrow hallway (in which portable devices move at a relatively faster rate).

In this example, the system may not have information as to which portable device is or is not permitted to enter the room in which access is determined to be restricted (e.g., via a card active door/gate). However, the described application software component may be configured to detect when the rate of people (via the detection of their portable devices) moved through the choke point at a rate which is substantially higher than predetermined upper threshold determined by the processor as to which the portable devices of users have previously been able to pass through the choke point having a card access door/gate. The detection of such an occurrence may correspond to people "tailgating" (i.e., one person unlocking the door or gate with a single access card being read by a card reader, followed by one or more additional people quickly moving through the open door or gate without using the card reader to read their access cards. Such additional people may not have access cards and/or the correct permissions associated with their access cards to unlock the door or gate. Thus, the detection of too many portable devices passing through a previously determined choke point may correspond to a detection of unauthorized portable devices accessing an unauthorized location.

In this example, the at least one processor may be configured to determine a first rate at which at least some of the portable devices pass a first location in the building in an amount of time based on the RF signals (e.g., BLE, WiFi signals). Here the first rate may correspond to (or be used to calculate) a determined upper threshold of authenticated users capable of passing through the entrance (e.g., properly via reading an access card) in the amount of time. In addition, the processor may be configured to determine a second rate at which further portable devices pass the first location in the building in the amount of time based on the RF signals. When the second rate is above the determined upper threshold, the processor may be configured to determine that the further portable devices are at the unauthorized location in the building and responsive thereto provide the described notification.

Figure 3:
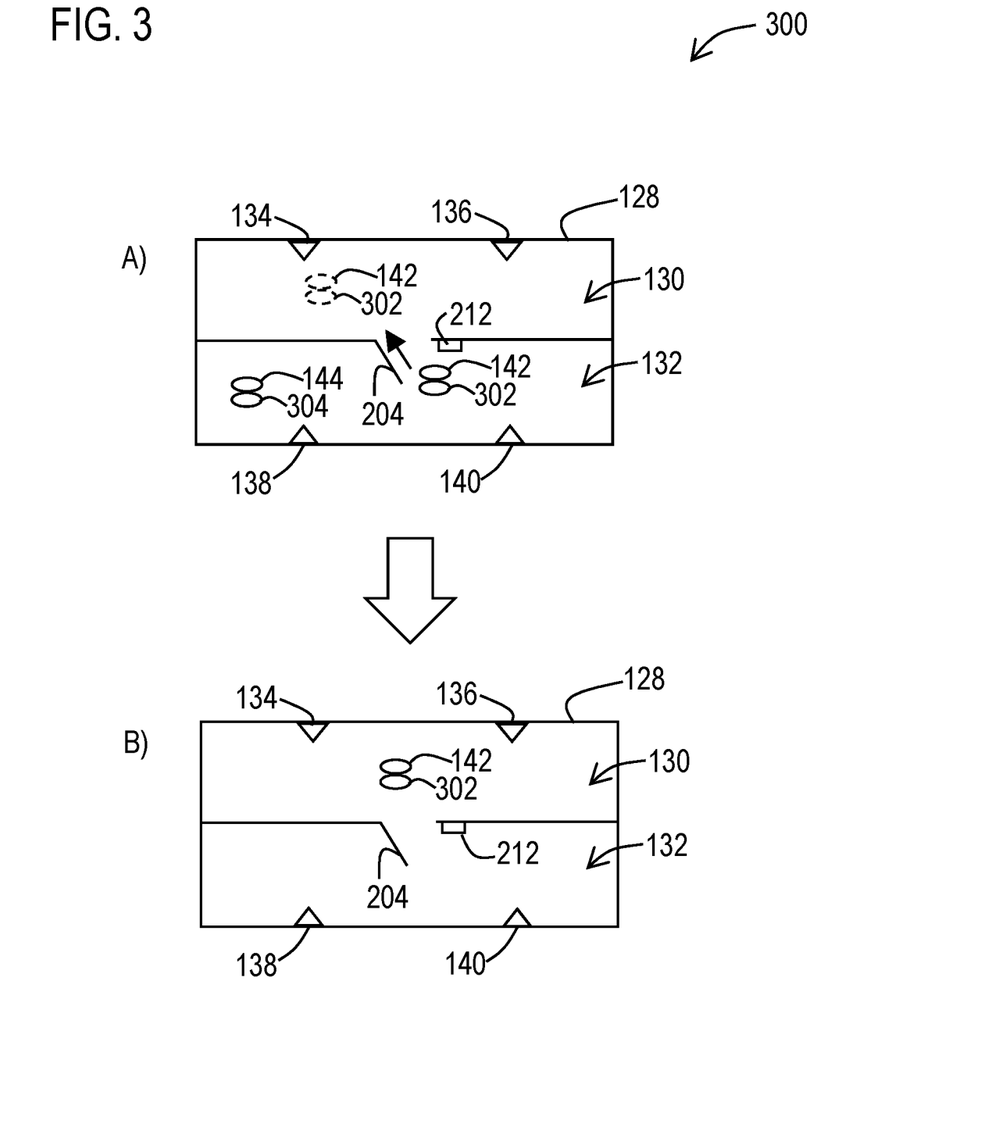

FIG. 3 illustrates another example scenario 300 in which the processor is configured to determine trends based on determined positions and movements of portable devices via RF signals (such as BLE or WiFi signals) and based on determined positions and movements of further devices (with different types of signals).

In this example the at least one processor may be configured to track positions of a plurality of the further devices (e.g., access tokens, such as cards and badges) over time based on information acquired from at least one further sensors in the building other than via BLE signals (or other than WiFi signals) for example, which information uniquely identifies each further device.

For example, the building 128 may include locked doors and/or gates 204 that are unlocked via scanning a user's access card 302 via a contact or contactless communication with a further sensor 212 (such as a card reader) that does not involve BLE (or WiFi). Such access cards may be associated with a user account maintained by a security system. Such user accounts may have one or more attributes that represent a type of user. For example, attributes associated with a user account may indicate whether the person assigned the access card is an employee type or an outside contractor type. Other examples of attributes may indicate whether the person assigned the access card is associated with one or more of a plurality of different security levels, clearance levels or any other type of attribute which can be used to group or classify people).

The processor 102 may be operative to access information from the security system regarding when a user uses their access cards to unlock doors as well as one or more attributes associated with the account of the user associated with the access card. The processor may be configured to determine correlations between respective portable devices 142, 144 and respective further devices 302, 304 (e.g., cards) based on determinations that the respective portable devices and respective further devices are detected at common positions and times in the building (e.g., a portable device is adjacent card reader when an access card is read). The processor may also determine correlations between determined attributes for a user account and positions and movements of portable devices. The processor 102 may then determine that a portable device is positioned in the unauthorized location in the building based at least in part on the determined correlations.

For example, with respect to as shown in FIG. 3, the processor 102 may be operative to determine that portable devices 142, 144 are adjacent respective cards 302, 304 when such cards are read by the various card readers in the building. In addition, the processor 102 may be operative to determine that the cards 302 and 304 are associated with different attributes. For example, the first card 302 may be associated with an employee type attribute, whereas the second card 304 may be associated with an outside contractor attribute. In addition, as illustrated in view A of the building 128, the processor may be configured to determine that a particular location (such as room 130) often has therein portable devices correlated to further devices (such as an access card) associated with an employee attribute. Further, the processor may be configured to determine that such a particular location (such as room 120) never (or rarely) appears to have portable devices detected therein that correlate to further devices (such as access cards) that are associated with an outside contractor attribute.

With this determined information, the processor may be configured to issue a notification when a situation illustrated in view B is detected, where a portable device is detected in a location (e.g., room 130) in which the portable device is correlated to a further device (such as an access card) associated an particular attribute (e.g., an outside contractor), and where the processor has determined that prior detected portable devices in that location were not previously correlated to (or are rarely correlated to) further devices (such as access cards) associated with this attribute (e.g., an outside contractor).

In this example, the detected unauthorized location (e.g., room 130) may correspond to a secure server room, for example, (or other restricted area) in which only employees with certain permissions are permitted, however the access door is such that an authorized user with a valid access card could violate the rules and open the door and let the unauthorized person into the room. In another example of this scenario, the first attribute may correspond to a male student type and the unauthorized location may correspond to a female student only locker room. It should be appreciated that in this example scenario, the unauthorized location may or may not have a door or gate that is unlocked using an access card, but may simply have a sign that indicates who is or who is not permitted in the location.

Figure 4:
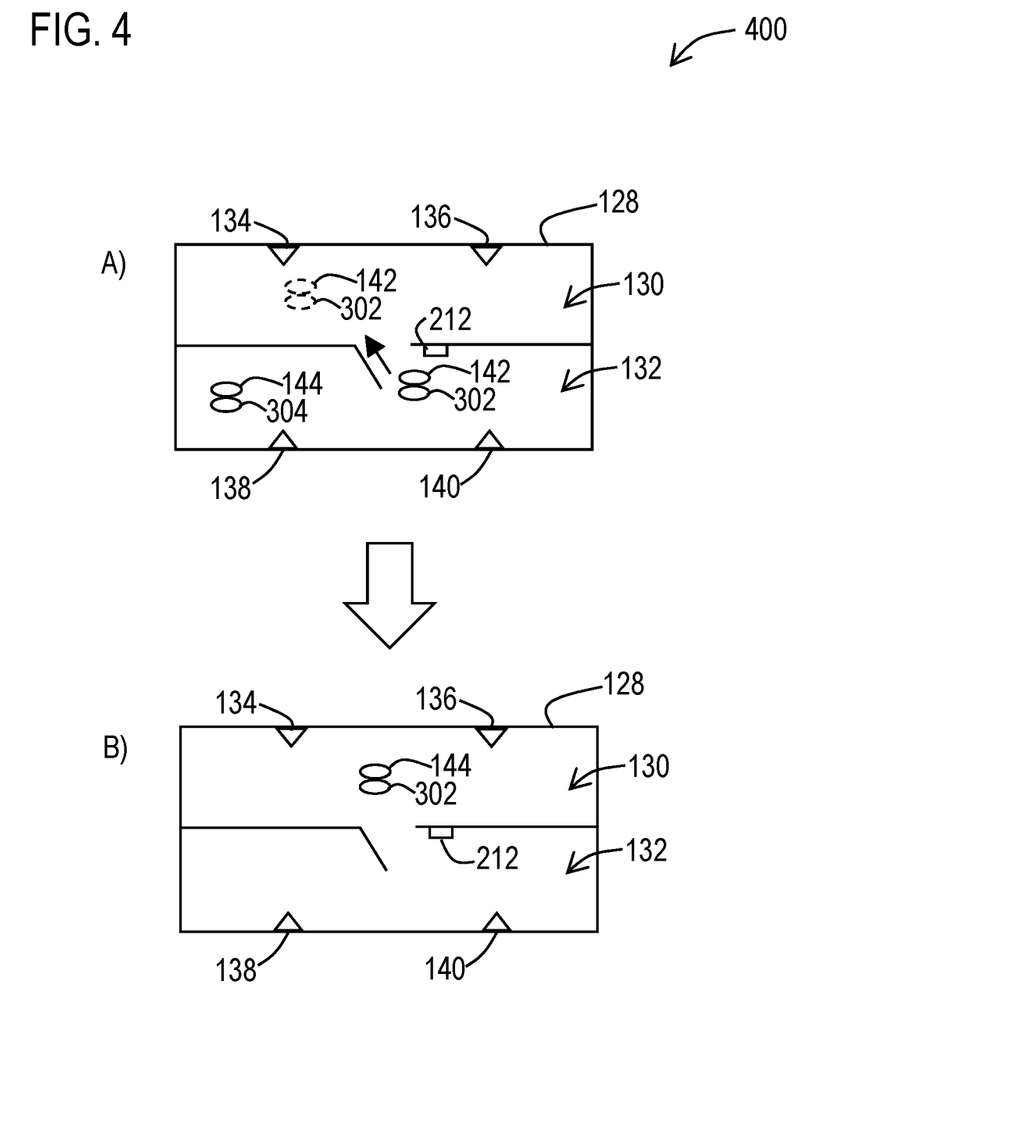

FIG. 4 illustrates another example scenario 400 in which the processor is configured to determine trends and correlations based on determined positions and movements of portable devices via RF signals (such as BLE signals) and based on determined positions and movements of further devices (with different types of signals). For example, as shown in view A of FIG. 4, the processor may be configured to determine correlations between respective portable devices 142, 144 and respective further devices 302, 304 (e.g., access cards) based on determinations that the respective portable devices and respective further devices are detected at common positions and times in the building (e.g., a portable device is adjacent a further sensor such as a card reader 212 when an access card is read by the card reader).

Subsequently as shown in view B of FIG. 4, the processor 102 may then determine that a portable device 144 is positioned in the unauthorized location (e.g., room 130) in the building 128 based at least in part on a determination that the at least one portable device 144 has now become correlated with a further device 302 that was previously correlated with at least one different portable device 142 (shown in view A) and the at least one portable device 144 was not previously determined to have been positioned at the unauthorized location (e.g., room 130).

This example scenario may correspond to a situation where an employee borrows or steals an access card of another user to enter an unauthorized location (e.g., an area in which their issued access card does not permit them entry). However, the person stealing or borrowing the access card continues to wear their previously detected and correlated portable device (e.g., an activity tracker). Thus, the described system is able to detect a discrepancy between portable device and further device that may indicate an unauthorized access to a location.

Figure 5:
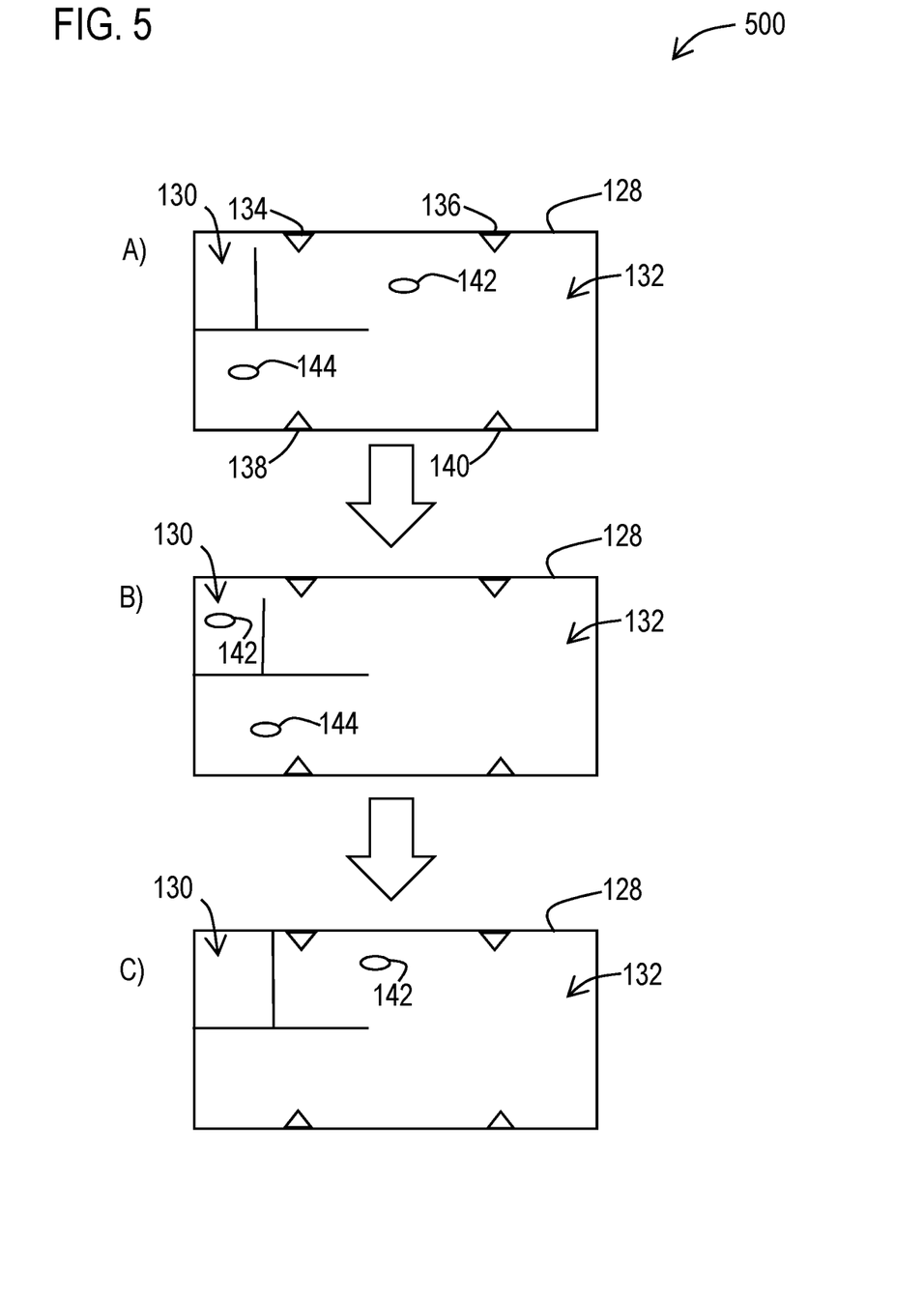

FIG. 5 illustrates another example scenario 500 in which the processor is configured to determine trends and correlations based on determined positions and movements of portable devices via RF signals (such as BLE signals). In this scenario the system may be configured to detect a person that attempts to hide in a small area in a building during the day and then waits until night and after regular business hours to come out of hiding and access an unauthorized location in the building.

For example, as illustrated in view A of the building in FIG. 5, the processor may be configured to determine a first place (e.g., small space 130) in the building at which portable devices are not previously detected. Such a first place may correspond to a hiding place in the building such as behind or inside a piece of furniture. The processor may also be configured to determine a second place (e.g., room 132) in the building where portable devices are detected during a first time period (such as during working hours) and are not detected during a second time period during the day (such as at night).

As illustrated in views B and C of the building in FIG. 5, the at least one processor may be configured to determine that the at least one portable device is positioned in the unauthorized location in the building corresponding to the second place (e.g., room 132) when the at least one processor detects that the at least one portable device had remained stationary in the first place (e.g., small space 130) during the first time period (view B) and subsequently moves to the second place (e.g., larger room 132) during the second time period (view C).

In this example, the person may be attempting hide until the larger room 132 is clear of people before carrying out some activity that may be unauthorized. Thus the larger room 132 may correspond to an authorized location for the user (and the user's portable device) at least during the second time period (such as at night).

It should also be appreciated that in this example, the particular portable device may or may not be new to the system. Thus the portable device could be one that has been tracked for many days prior to the activity, and/or be worn for the first time when detected in this example scenario.

In the example scenarios illustrated in FIGS. 2 to 5, the described system may use BLE sensors in order to take advantage of the insight that portable devices that use BLE (such as activity trackers) are typically continuously worn by a user and thus may correlate better with the detection of people at unauthorized locations than devices that are less personal (such as WiFi enabled tablet). In addition, the described sceneries of detected portable devices in unauthorized locations may be based on additional or alternative detections of trends and correlations. For example, the processor may be operative to detect in each of these examples that the unauthorized access to a location occurs in a time frame during the day at which portable devices are not typically detected and/or are in which additional portable devices are not currently being detected.

It should also be appreciated that portable devices may further include additional features which assist in tracking them via the described sensors. For example, the portable devices may include applications thereon, which are responsive to Bluetooth signals from BLE beacons to communicate information to a server which may be used to further track the movements of the portable devices in a building. Such applications may further enable notifications to be communicated to the portable device regarding the building, emergency information, and/or any other information that may be useful to send the user while in the building.

It should also be appreciated that the described RF sensors (such as BLE sensors) may have a form factor that enables them to be readily mounted in spaced-apart relation across a building. For example, an example embodiment of an RF sensor may have a shape that can be inserted into a cylindrical hole drilled in a wall. An installer may drill holes in various places in drywall of a room wall and insert the RF sensors in each hole. In some embodiments, the installer may cover the RF sensors/holes with a patching compound, mud, paint, or other covering. Such a portable device may be powered via a battery, wires to a power source, solar cell, RF power harvesting device, and/or any other type of electrical power source. For example the sensor could have a solar cell that forms a circular flange larger than the hole in the drywall that prevents the portion of the RF sensor inserted into the hole from falling out of the hole inside wall. Also, as discussed previously, the at least one processor 102 may be configured to determine the general relative locations of such RF sensors overtime from RF signals (e.g., BLE signals) wirelessly outputted by the RF sensors to the processor 102. The RF sensor locations may be determined by the processor based on correlations regarding RF power levels and the unique identifiers for many different portable devices moving across the building over time that are detected by the RF sensors.

In other examples, the RF sensors may be integrated into exit signs, lighting fixtures, building control modules (e.g., for temperature, lighting, and window shade control), furniture, and/or any other structure that forms and/or may be included in a building.

In addition, it should be appreciated that the information regarding the position of portable devices in a building may be useful in emergency situations. For example, because BLE type devices (activity trackers) tend to be worn all the time, such devices may be a more reliable indicator of the number of people in a building or remaining in a building after an evacuation during an emergency situation (fire, earthquake) compared to other types of portable devices. Other types of portable devices which primarily use WiFi or classic Bluetooth communications, may be left behind when a user has left the building during lunch or during an emergency, and thus may not reliably indicate if a user is still in a building.

Further, BLE type devices may more accurately reflect that the number of people in a building is greater than expected (e.g., compared to card reader scans). For example, in the tailgating example described previously, additional people may be let in a building without having their access cards being scanned, when another person enters the building or opens a door from the inside. Such information about the number of people wearing BLE type devices may be useful for emergency responder (firefighters, EMS, police) when assessing whether people may still be present in an evacuated building.

In addition, because BLE type devices may provide a unique identifier, such a unique identifier may be captured by the at least one processor and correlated with the same unique identifier previously stored in the data store 108 in association with user information (e.g., human resource data, medical records, student records, housing records). Such a unique identifier, for example, may correspond to a MAC address of the portable device which is stored in the database in association with the users' information when the person is hired by an employer, registers for classes, or any other time.

During an emergency situation, the at least one processor may be capable of determining relevant information about individuals associated with portable devices that remain detected in a building that was attempted to be fully evacuated. Such individuals could be unconscious, injured and/or have a known medical condition stored in the data store 108 (e.g., whether a person is blind, paraplegic, diabetic, epileptic) that could hinders them from evacuating). The at least one processor may be capable of determining the location in the building of a portable devices that remains in the building and correlate the unique identifiers of the portable devices to corresponding user records in the data store 108. The location of the portable devices and associated information about the users (such as their name, mobile phone number and/or medical condition), may be communicated by the described system 100 to an emergency service (such as a server) that is configured to communicate such received information regarding users to emergency responders.

Figure 6:
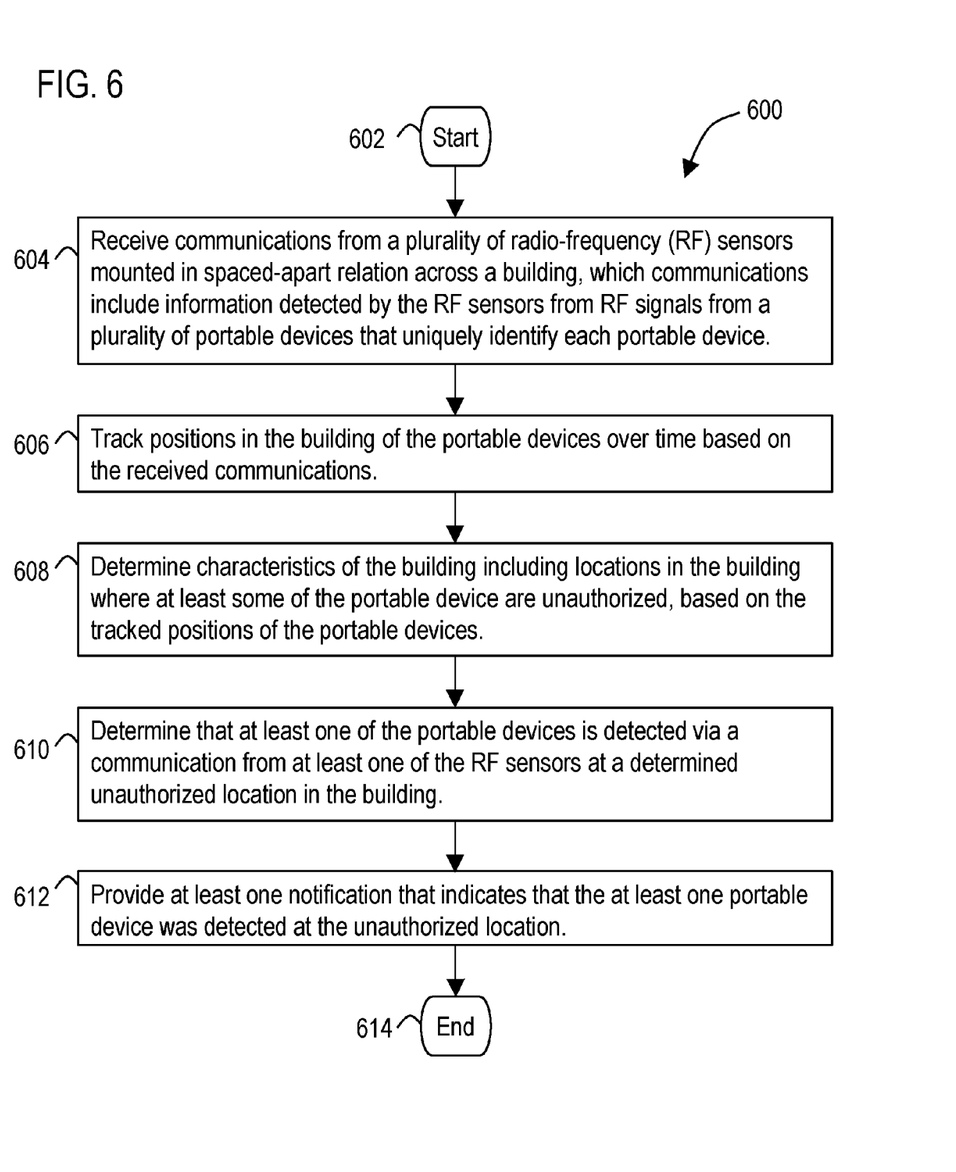
FIG. 6 illustrates a flow diagram of an example methodology that facilitates passive building information discovery.

With reference now to FIG. 6, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 6, a methodology 600 is illustrated that facilitates passive building information discovery. The method may start at 602 and the methodology may include several acts carried out through operation of at least one processor.

These acts may include an act 604 of receiving communications from a plurality of radio-frequency (RF) sensors mounted in spaced-apart relation across a building, which communications include information detected by the RF sensors from RF signals from a plurality of portable devices that uniquely identify each portable device. In addition, the methodology may include an act 606 of tracking positions in the building of the portable devices over time, based on the received communications. Further, the methodology may include an act 608 of determining characteristics of the building including locations in the building where at least some of the portable device are unauthorized, based on the tracked positions of the portable devices. Also, the methodology may include an act 610 of determining that at least one of the portable devices is detected via a communication from at least one of the RF sensors at a determined unauthorized location in the building. In addition, the methodology may include an act 612 of providing at least one notification that indicates that the at least one portable device was detected at the unauthorized location. At 614 the methodology may end.

It should be appreciated that the methodology 600 may include other acts and features discussed previously with respect to the processing system 100. For example, (as discussed previously) the RF sensors involved in this described methodology may be BLE sensors and the RF signals may be BLE signals. However, in other examples the methodology may be carried with respect to alternative or additional types of RF signals and sensors such as WiFi sensors/signals, other forms of Bluetooth sensors/signals, and/or any other types of sensors capable of detecting any other type of RF signals outputted by portable devices.

In addition the described methodology 600 may include an act of providing the at least one notification to at least one of an alarm system, a display screen, a data base, a second at least one processor, or any combination thereof.

Further, the methodology may include addition acts such as determining: a first rate at which at least some of the portable devices pass a first location in the building in an amount of time based on the BLE signals; determining a second rate at which further portable devices pass the first location in the building in the amount of time based on the BLE signals; and determining that the further portable devices are at the unauthorized location in the building and responsive thereto provide the at least one notification, based on the second rate being higher than the first rate.

In addition, in some example embodiments of this described methodology, the first location may correspond to an entrance to a room that is configured with a door that automatically unlocks responsive to an authentication of a user. Also, the first rate may correspond to an upper threshold of authenticated users capable of passing through the entrance in the amount of time.

Also, the methodology may include additional acts such as: tracking positions of a plurality of further devices over time based on information acquired from at least one further sensors in the building other than via BLE signals, which information uniquely identifies each further device; and determining correlations between respective portable devices and respective further devices based on determinations that the respective portable devices and respective further devices are detected at common positions and times in the building. In this example, the act of determining that the at least one portable device is positioned in the unauthorized location in the building may be based at least in part on the determined correlations.

In this described example, the at least one further sensor may correspond to a card reader and the further devices may correspond to identification cards. Also, determining that the at least one portable device is positioned in the unauthorized location in the building may be based at least in part on: determining that the at least one portable device is correlated to a further device associated with at least one first attribute; and determining that prior detected portable devices in the unauthorized location were not previously correlated to further devices associated with the at least one first attribute.

In another example, the at least one further sensor may correspond to a card reader, the further devices may correspond to identification cards, and the card reader may be configured to unlock a door to the unauthorized location in the building. In addition the methodology may include determining that the at least one portable device has become correlated with a further device that was previously correlated with at least one different portable device and the at least one portable device was not previously determined to have been positioned at the unauthorized location.

Example embodiments of the methodology 600 may also include act such as: determining a first place in the building at which portable devices are not previously detected; determining a second place in the building where portable devices are detected during a first time period and are not detected during a second time period during the day; and determining that the at least one portable device is positioned in the unauthorized location in the building corresponding to the second place when the at least one processor detects that the at least one portable device remains stationary in the first place during the first time period and moves to the second place during the second time period.

As discussed previously, the at least one portable device may include a display screen and a band or strap configured to mount the portable device to a wrist of a user. Also, the at least one portable device may include a media access control (MAC) address and the detected information that uniquely identifies the at least one portable device may include the MAC address. In addition the methodology may further include the acts of: determining information about the user of the at least one portable device from at least one data store based on the MAC address associated with the at least one portable device; and communicating the determined information about the user to an emergency responder.

As discussed previously, acts associated with these methodologies (other than any described manual acts) may be carried out by one or more processors. Such processor(s) may be included in one or more data processing systems, for example, that execute software components (such as the described application software component) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 7:
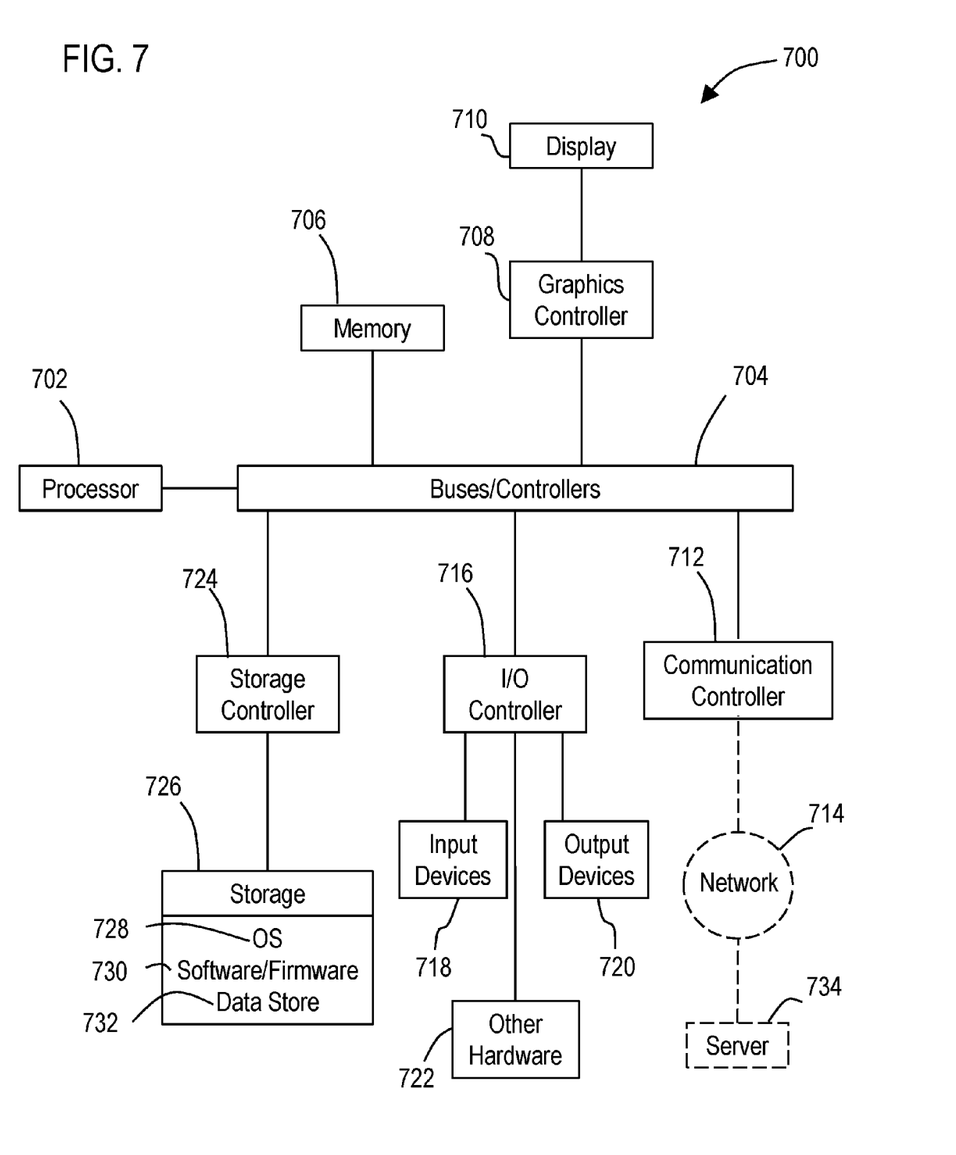
FIG. 7 illustrates a block diagram of a data processing system in which an embodiment may be implemented.

FIG. 7 illustrates a block diagram of a data processing system 700 (also referred to as a computer system) in which an embodiment can be implemented, for example, as a portion of a building system, and/or other system operatively configured by software or otherwise to perform the processes as described herein. The data processing system depicted includes at least one processor 702 (e.g., a CPU) (which may correspond to the at least one processor 102) that may be connected to one or more bridges/controllers/buses 704 (e.g., a north bridge, a south bridge). One of the buses 704, for example, may include one or more I/O buses such as a PCI Express bus. Also connected to various buses in the depicted example may include a main memory 706 (RAM) and a graphics controller 708. The graphics controller 708 may be connected to one or more display devices 710. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 712 (Ethernet controllers, WiFi controllers, cellular controllers) operative to connect to a local area network (LAN), Wide Area Network (WAN), a cellular network, and/or other wired or wireless networks 714 or communication equipment.

Further components connected to various busses may include one or more I/O controllers 716 such as USB controllers, Bluetooth controllers, and/or dedicated audio controllers (connected to speakers and/or microphones). It should also be appreciated that various peripherals may be connected to the I/O controller(s) (via various ports and connections) including input devices 718 (e.g., keyboard, mouse, pointer, touch screen, touch pad, drawing tablet, trackball, buttons, keypad, game controller, gamepad, camera, microphone, scanners, motion sensing devices that capture motion gestures), output devices 720 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 702 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 722 connected to the I/O controllers 716 may include any type of device, machine, or component that is configured to communicate with a data processing system.

Additional components connected to various busses may include one or more storage controllers 724 (e.g., SATA). A storage controller may be connected to a storage device 726 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 704 such as a PCI Express bus.

A data processing system in accordance with an embodiment of the present disclosure may include an operating system 728, software/firmware 730, and data stores 732 (that may be stored on a storage device 726 and/or the memory 706). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 712 may be connected to the network 714 (not a part of data processing system 700), which can be any public or private data processing system network or combination of networks, as known to those of skill in the art, including the Internet. Data processing system 700 can communicate over the network 714 with one or more other data processing systems such as a server 734 (also not part of the data processing system 700). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 702 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 700 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device.

Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 700 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for passive building information discovery comprising:
   at least one processor configured to:
   receive communications from a plurality of Bluetooth Low Energy (BLE) sensors mounted in spaced-apart relation across a building, which communications include information detected by the BLE sensors from BLE signals from a plurality of portable devices that uniquely identify each portable device;
   track positions in the building of the portable devices over time based on the received communications;
   based on the tracked positions, determine a first place in the building at which portable devices are not previously detected;
   based on the tracked positions, determine a second place in the building where portable devices are detected during a first time period and are not detected during a second time period during the day;
   determine when at least one of the portable devices is positioned in an unauthorized location in the building corresponding to the second place when the at least one processor detects that the at least one portable device remains stationary in the first place during the first time period and moves to the second place during the second time period, and responsive thereto provide at least one notification regarding the determination about the unauthorized location.

2. The system according to claim 1, further comprising the BLE sensors mounted in spaced-apart relation in the building in communication with the at least one processor, wherein the at least one processor is configured to provide the at least one notification to at least one of an alarm system, a display screen, a data base, a second at least one processor, or any combination thereof.

3. A system for passive building information discovery comprising:
at least one processor configured to:
receive communications from a plurality of Bluetooth Low Energy (BLE) sensors mounted in spaced-apart relation across a building, which communications include information detected by the BLE sensors from BLE signals from a plurality of portable devices that uniquely identify each portable device;
track positions in the building of the portable devices over time based on the received communications;
determine a first rate corresponding to how many of at least some of the portable devices pass a first location in the building in an amount of time based on the BLE signals;
determine a second rate corresponding to how many of further of the portable devices pass the first location in the building in the amount of time based on the BLE signals;
determine that the further portable devices are positioned in an unauthorized location in the building based at least in part on the second rate being higher than the first rate, and responsive thereto provide at least one notification regarding the determination about the unauthorized location.

4. The system according to claim 3, wherein the first location corresponds to an entrance to a room that is configured with a door that automatically unlocks responsive to an authentication of a user, whereby the first rate corresponds to an upper threshold of authenticated users capable of passing through the entrance in the amount of time.

5. A system for passive building information discovery comprising:
at least one processor configured to:
receive communications from a plurality of Bluetooth Low Energy (BLE) sensors mounted in spaced-apart relation across a building, which communications include information detected by the BLE sensors from BLE signals from a plurality of portable devices that uniquely identify each portable device;
track positions in the building of the portable devices over time based on the received communications;
track positions of a plurality of further devices over time based on information acquired from at least one further sensor in the building other than via BLE signals, which information uniquely identifies each further device;
determine correlations between respective portable devices and respective further devices based on determinations that the respective portable devices and respective further devices are detected at common positions and times in the building; and
determine when at least one of the portable devices is positioned in an unauthorized location in the building based at least in part on the determined correlations, and responsive thereto provide at least one notification regarding the determination about the unauthorized location.

6. The system according to claim 5, wherein the at least one processor is configured to determine that the at least one portable device is positioned in the unauthorized location in the building based at least in part on a determination that the at least one portable device is correlated to a further device associated with at least one first attribute, and based on a determination that prior detected portable devices in the unauthorized location were not previously correlated to further devices associated with the at least one first attribute.

7. The system according to claim 6, wherein the at least one further sensor corresponds to a card reader, wherein the further devices correspond to identification cards.

8. The system according to claim 5, wherein the at least one processor is configured to determine that the at least one portable device is positioned in the unauthorized location in the building based at least in part on a determination that the at least one portable device has become correlated with a further device that was previously correlated with at least one different portable device and the at least one portable device was not previously determined to have been positioned at the unauthorized location.

9. The system according to claim 8, wherein the at least one further sensor corresponds to a card reader, wherein the further devices correspond to identification cards, wherein the card reader is configured to unlock a door to the unauthorized location in the building.

10. The system according to claim 5, further comprising the BLE sensors mounted in spaced-apart relation in the building in communication with the at least one processor, wherein the at least one processor is configured to provide the at least one notification to at least one of an alarm system, a display screen, a data base, a second at least one processor, or any combination thereof.

11. A method for passive building information discovery comprising:
through operation of at least one processor:
receiving communications from a plurality of Bluetooth Low Energy (BLE) sensors mounted in spaced-apart relation across a building, which communications include information detected by the BLE sensors from BLE signals from a plurality of portable devices that uniquely identify each portable device;
tracking positions in the building of the portable devices over time based on the received communications;
based on the tracked positions, determining a first place in the building at which portable devices are not previously detected;
based on the tracked positions, determining a second place in the building where portable devices are detected during a first time period and are not detected during a second time period during the day;
detecting that at last one of the portable devices remains stationary in the first place during the first time period and moves to the second place during the second time period and responsive thereto determining that the at least one portable device is positioned in an unauthorized location in the building corresponding to the second place; and
providing at least one notification regarding the determination about the unauthorized location.

12. A method for passive building information discovery comprising:
through operation of at least one processor:
receiving communications from a plurality of Bluetooth Low Energy (BLE) sensors mounted in spaced-apart relation across a building, which communications include information detected by the BLE sensors from BLE signals from a plurality of portable devices that uniquely identify each portable device;
tracking positions in the building of the portable devices over time based on the received communications;

determining a first rate corresponding to how many of at least some of the portable devices pass a first location in the building in an amount of time based on the BLE signals;

determining a second rate corresponding to how many of further of the portable devices pass the first location in the building in the amount of time based on the BLE signals;

determining that the further portable devices are positioned in an unauthorized location in the building based on the second rate being higher than the first rate; and providing at least one notification regarding the determination about the unauthorized location.

13. A non-transitory computer readable medium encoded with executable instructions that when executed, cause at least one processor to carry out a method according to claim 12.

14. The method according to claim 12, wherein the first location corresponds to an entrance to a room that is configured with a door that automatically unlocks responsive to an authentication of a user, whereby the first rate corresponds to an upper threshold of authenticated users capable of passing through the entrance in the amount of time.

15. A method for passive building information discovery comprising:

through operation of the at least one processor:
receiving communications from a plurality of Bluetooth Low Energy (BLE) sensors mounted in spaced-apart relation across a building, which communications include information detected by the BLE sensors from BLE signals from a plurality of portable devices that uniquely identify each portable device;

tracking positions in the building of the portable devices over time based on the received communications;

tracking positions of a plurality of further devices over time based on information acquired from at least one further sensor in the building other than via BLE signals, which information uniquely identifies each further device;

determining correlations between respective portable devices and respective further devices based on determinations that the respective portable devices and respective further devices are detected at common positions and times in the building;

determining that at least one of the portable devices is positioned in an unauthorized location in the building based at least in part on the determined correlations; and providing at least one notification regarding the determination about the unauthorized location.

16. The method according to claim 15, wherein the at least one further sensor corresponds to a card reader, wherein the further devices correspond to identification cards, wherein determining that the at least one portable device is positioned in the unauthorized location in the building is based at least in part on:

determining that the at least one portable device is correlated to a further device associated with at least one first attribute; and determining that prior detected portable devices in the unauthorized location were not previously correlated to further devices associated with the at least one first attribute.

17. The method according to claim 15, wherein the at least one further sensor corresponds to a card reader, wherein the further devices correspond to identification cards, wherein the card reader is configured to unlock a door to the unauthorized location in the building, wherein determining that the at least one portable device is positioned in the unauthorized location in the building based at least in part on:

determining that the at least one portable device has become correlated with a further device that was previously correlated with at least one different portable device and the at least one portable device was not previously determined to have been positioned at the unauthorized location.

18. A non-transitory computer readable medium encoded with executable instructions that when executed, cause at least one processor to carry out a method according to claim 15.

19. The method according to claim 15, wherein the at least one portable device includes a display screen and a strap or band configured to mount the portable device to a wrist of a user, wherein the at least one portable device includes a media access control (MAC) address, wherein the detected information that uniquely identifies the at least one portable device includes the MAC address, further comprising through operation of the at least one processor:

determining information about the user of the at least one portable device from at least one data store based on the MAC address associated with the at least one portable device; and communicating the determined information about the user in the at least one notification.

20. A non-transitory computer readable medium encoded with executable instructions that when executed, cause at least one processor to carry out a method comprising:

receiving communications from a plurality of Bluetooth Low Energy (BLE) sensors mounted in spaced-apart relation across a building, which communications include information detected by the BLE sensors from BLE signals from a plurality of portable devices that uniquely identify each portable device;

tracking positions in the building of the portable devices over time based on the received communications;

based on the tracked positions, determining a first place in the building at which portable devices are not previously detected;

based on the tracked positions, determining a second place in the building where portable devices are detected during a first time period and are not detected during a second time period during the day;

detecting that at least one of the portable devices remains stationary in the first place during the first time period and moves to the second place during the second time period and responsive thereto determining that the at least one portable device is positioned in an unauthorized location in the building corresponding to the second place; and providing at least one notification regarding the determination about the unauthorized location.

* * * * *